E. A. CHAPPELL.
POULTRY FEEDER.
APPLICATION FILED DEC. 4, 1913.
1,122,685.
Patented Dec. 29, 1914.
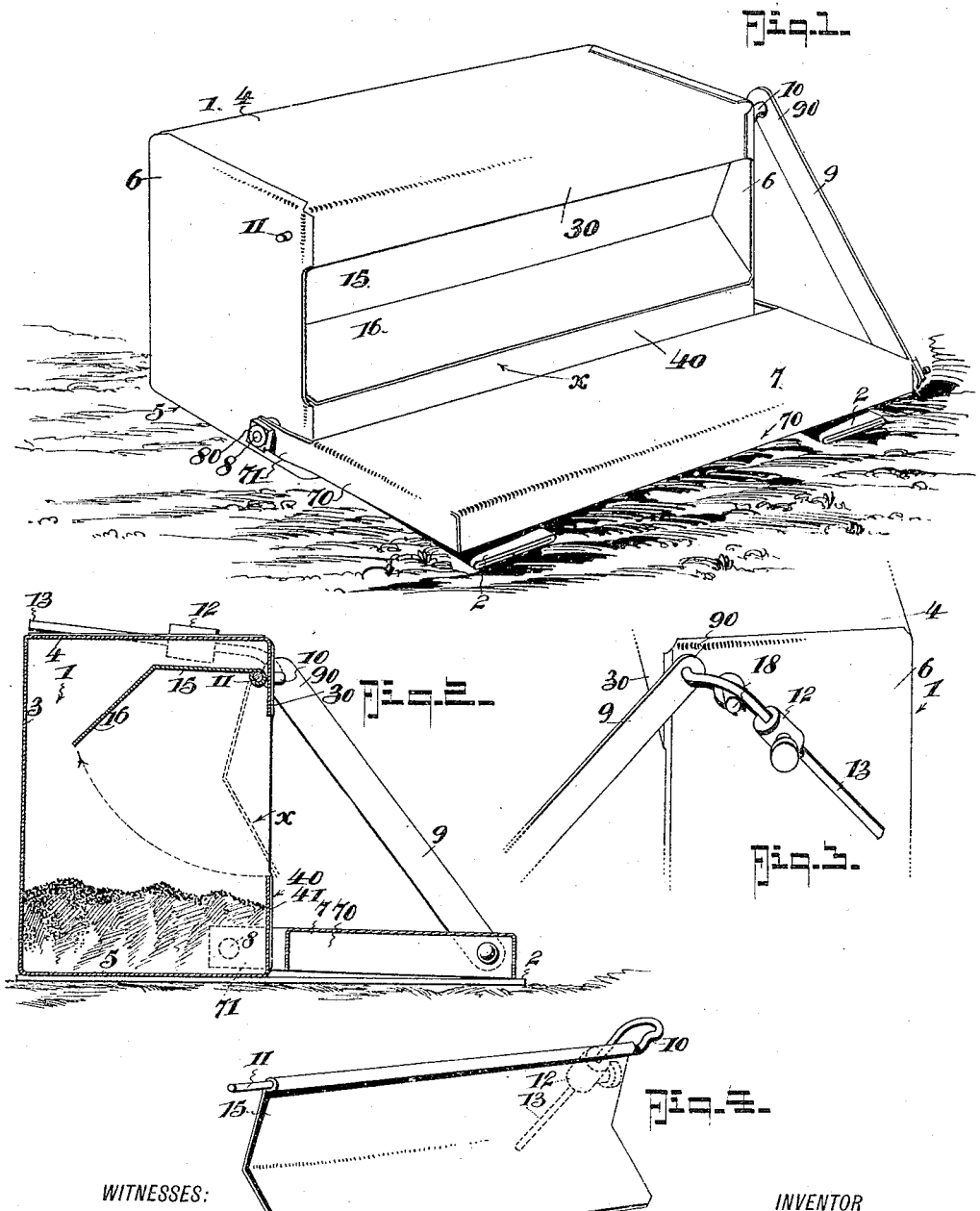
WITNESSES:
John T. Schrott.
Charles J. Diller.
INVENTOR
E. A. Chappell.
BY
Fred G. Dieterich
ATTORNEYS

UNITED STATES PATENT OFFICE.

EDWARD A. CHAPPELL, OF PLYMOUTH, OHIO.

POULTRY-FEEDER.

1,122,685.   Specification of Letters Patent.   Patented Dec. 29, 1914.

Application filed December 4, 1913. Serial No. 804,630.

*To all whom it may concern:*

Be it known that I, EDWARD A. CHAPPELL, residing at Plymouth, in the county of Richland and State of Ohio, have invented a new and Improved Poultry-Feeder, of which the following is a specification.

This invention has reference to improvements in feeding means more especially designed for being used in connection with poultry and pigeon raising, and it primarily has for its object to provide a simple and inexpensive feeding means of the general character stated, capable of being readily moved about as desired and in which the parts are coöperatively so arranged whereby the feeder is rendered practically rat, mouse and sparrow proof.

Another object of my invention is to provide a poultry feeder in which the food holding chamber or trough is closed when not in use and which is automatically opened to afford access to the trough when the fowl or pigeon advances to the trough for feeding; and in which a swingable closure member is included that also serves as an effective means for keeping the rain out of the food trough.

With other objects in view that will hereinafter appear my improved feeding means embodies the peculiar construction and novel combination of parts all of which will be hereinafter fully explained, specifically pointed out in the appended claims and illustrated in the accompanying drawings, in which:

Figure 1 is a perspective view of my invention, the parts being at the normal position. Fig. 2 is a transverse section thereof, the hinged closure member being shown swung back to an open position. Fig. 3 is a detail perspective view of one end of the feeder. Fig. 4 is a similar view of the combined closure and water shed member hereinafter referred to.

In the practical embodiment of my invention, the same includes a housing 1, formed entirely of sheet metal, and having the shape best shown in Fig. 1, and for conveniently dragging the feeder over the ground from place to place, a pair of forwardly projected members or runners 2 are secured on the bottom of the housing, as shown. The housing includes the closed back, top, bottom and end members, designated 3, 4, 5, and 6, and these are connected by closed joints, the reason for which will presently appear.

40 designates a front section formed by bending up an extension 41 of the bottom 5, the ends of which are soldered or otherwise closely joined with the front edges of the ends 6, and 30 designates an upper front member formed by bending down an extension of the top 4, as is clearly shown in Fig. 2, and the said member 30 has its end fastened water-tight to the upper front edge of the ends 6—6.

7 designates a platform formed of sheet metal bent to include pendent end portions 70, provided with an apertured extension 71 arranged for straddling the lower front end of the housing 1, and for engaging the pivot studs 8 that project from the ends 6—6, to which they are held by the lock nuts 80.

A lever arm 9 is pivotally connected at the lower end to the outer end of the platform 7, and its upper end 90 is pivotally joined with a crank portion 10 of a rock rod 11 that extends across the upper part of the housing back of the upper front member 30, and which is normally rocked in one direction by weight 12 adjustably mounted on a rearwardly extended arm 13 formed by bending the outer end of the rod 11 back at right angles to its crank portion, it being obvious, by referring to the drawing that any weight applied on the tiltable platform 7 tends to pull the lever member 9 down and in consequence rock the rod 11 in an outward direction and correspondingly lifts the arm 13 and weight 12. By adjustably mounting the weight on the arm 13, the platform 7 can be set "light" for being tilted by pigeons or young chickens or "heavy" for old stock. It will be noticed from Figs. 1 and 2, the tiltable platform is so arranged, relatively to the trough portion proper, that the stock when standing thereon can readily gain access to the food held in the trough.

Among the objectionable features in using poultry feeders, particularly out-door feeders, is the danger of rats, mice and small birds getting at the food. In the complete arrangement of my invention, I have provided means that not alone automatically closes off the feed opening $x$ in the front of the housing, when the feeder is not in use, and so securely as to keep out the mice, rats and birds, but also serves as an effective water shed for keeping the rain from beating into the housing through the said opening *x*. For such purpose I use a sheet metal closure member 15, of a length to fit snugly between the ends of the housing. The member 15, the upper edge of which, its full length, engages the rocking or cross rod 11, to which it is fixedly connected, is made > shaped in cross section, and it is of such height, that the lower edge 16, when the parts are at the normal position, fits closely over and extends slightly beyond the upper edge of the lower front cross member 40 of the housing. By reason of forming the closure member 15 as stated, the said member effectively serves to always keep the opening *x* of the housing closed when the feeder is not in use, and to positively deflect the rain that would tend to beat through the opening *x* and cause it to be deflected over the front of the house, it being apparent by referring to Fig. 2, since the upper front member 30 extends down below the upper hinged end of the closure member 15, the said member 30 also serves as a deflector for keeping the rain from beating over the upper or hinged end of the closure member 15.

18 designates a stop lug that projects from that end of the housing having the crank arm extension of the rod 11 and the said stop lug is provided to limit the upward swing of the platform 9, and to hold the member 15 to its proper closing position, relatively to the housing opening *x*.

From the foregoing description taken in connection with the drawing the complete arrangement, the manner of its use and the advantages of my invention will be readily apparent. By reason of forming the housing, with its > shaped closure member, as stated, the food compartment is held practically water-tight and closed against access thereto by rats, mice, birds, etc. and the balancing of the front hinged member may be readily adjusted so that the feeder can be quickly set for use for young or old stock.

What I claim is:—

1. A poultry feeding device comprising a housing whose bottom portion forms a trough, a feed opening that extends entirely across the front of the housing, a swingable closure member for the opening pendently supported within the housing, said member being > shaped in cross section with its lower edge normally held projected over the lower edge of the feed opening, a tiltable platform, and means operable by a downward movement of the tiltable platform connected with the swingable closure member and adapted for swinging the said member to its open position when the platform is depressed.

2. A poultry feeding device comprising a housing whose bottom portion forms a trough, a feed opening that extends entirely across the front of the housing, a swingable closure member for the opening pendently supported within the housing, said member being > shaped in cross section with its lower edge normally held projected over the lower edge of the feed opening, a tiltable platform, means operable by a downward movement of the tiltable platform connected with the swingable closure member and adapted for swinging the said member to its open position when the platform is depressed, the said means including a cross bar on which the closure member is pendently mounted, said bar having an extension outside the housing formed into a crank portion and a rearwardly extended arm, a lever connection that joins the crank portion and the outer end of the tiltable platform, and a weight adjustably mounted on the arm.

3. A poultry feeding device comprising a housing whose bottom portion forms a trough, a feed opening that extends entirely across the front of the housing, a swingable closure member for the opening pendently supported within the housing, said member being > shaped in cross section with its lower edge normally held projected over the lower edge of the feed opening, a tiltable platform, means operable by a downward movement of the tiltable platform connected with the swingable closure member and adapted for swinging the said member to its open position when the platform is depressed, the said means including a cross bar on which the closure member is pendently mounted, sand bar having an extension outside the housing formed into a crank portion, and a rearwardly extended arm, a lever connection that joins the crank portion and the outer end of the tiltable platform, a weight adjustably mounted on the arm, and a stop lug that projects from the housing for engaging with and limiting the drop movement of the weighted arm.

EDWARD A. CHAPPELL.

Witnesses:
H. H. Chappell,
A. A. Shadle.